US010567772B2

(12) United States Patent
Xu et al.

(10) Patent No.: US 10,567,772 B2
(45) Date of Patent: Feb. 18, 2020

(54) SUB8×8 BLOCK PROCESSING

(71) Applicant: GOOGLE LLC, Mountain View, CA (US)

(72) Inventors: Yaowu Xu, Saratoga, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 124 days.

(21) Appl. No.: 15/646,370

(22) Filed: Jul. 11, 2017

(65) Prior Publication Data
US 2019/0020878 A1    Jan. 17, 2019

(51) Int. Cl.
| H04N 19/103 | (2014.01) |
| H04N 19/137 | (2014.01) |
| H04N 19/44 | (2014.01) |
| H04N 19/593 | (2014.01) |
| H04N 19/13 | (2014.01) |
| H04N 19/159 | (2014.01) |
| H04N 19/176 | (2014.01) |
| H04N 19/51 | (2014.01) |
| H04N 19/186 | (2014.01) |
| H04N 19/124 | (2014.01) |

(52) U.S. Cl.
CPC ......... *H04N 19/137* (2014.11); *H04N 19/103* (2014.11); *H04N 19/13* (2014.11); *H04N 19/159* (2014.11); *H04N 19/176* (2014.11); *H04N 19/186* (2014.11); *H04N 19/45* (2014.11); *H04N 19/51* (2014.11); *H04N 19/593* (2014.11); *H04N 19/124* (2014.11)

(58) Field of Classification Search
CPC .... H04N 19/137; H04N 19/103; H04N 19/13; H04N 19/45; H04N 19/593; H04N 19/124
USPC ....................................... 375/240.24
See application file for complete search history.

(56) References Cited

U.S. PATENT DOCUMENTS

| 7,616,692 | B2 | 11/2009 | Holcomb et al. | |
| 9,591,325 | B2 | 3/2017 | Li et al. | |
| 2012/0177112 | A1* | 7/2012 | Guo | H04N 19/13 375/240.12 |

(Continued)

OTHER PUBLICATIONS

Bankoski, et al., "Technical Overview of VP8, An Open Source Video Codec for the Web", Jul. 11, 2011, 6 pp.

(Continued)

*Primary Examiner* — James T Boylan
(74) *Attorney, Agent, or Firm* — Young Basile Hanlon & MacFarlane, P.C.

(57) ABSTRACT

Methods and apparatuses for coding a current block are disclosed. An apparatus for decoding a current block of size 8×8 including a memory and a processor is also disclosed. The processor configured to execute instructions stored in the memory to generate, for the current block, a luma block and a chroma block, divide the luma block into luma sub-blocks, and determine a respective prediction mode for each luma sub-block. The chroma block is of size 4×4, each luma sub-block is of size 4×4, and the respective prediction mode is an intra-mode or an inter-mode. The instructions also include instructions to, on condition that each of the respective prediction modes is the inter-mode, divide the chroma block into 2×2 chroma sub-blocks and determine a respective motion vector for each chroma sub-block.

13 Claims, 9 Drawing Sheets

(56) References Cited

U.S. PATENT DOCUMENTS

| | | | | |
|---|---|---|---|---|
| 2013/0170553 A1* | 7/2013 | Chen | ............ | H04N 19/52 375/240.16 |
| 2015/0078447 A1* | 3/2015 | Gamei | ............ | H04N 19/122 375/240.12 |
| 2015/0189289 A1* | 7/2015 | Kim | ............ | H04N 19/167 375/240.02 |
| 2018/0063553 A1* | 3/2018 | Zhang | ............ | H04N 19/46 |
| 2018/0131962 A1* | 5/2018 | Chen | ............ | H04N 19/96 |
| 2018/0184131 A1* | 6/2018 | Yoo | ............ | H04N 19/159 |
| 2018/0288446 A1* | 10/2018 | An | ............ | H04N 19/96 |

OTHER PUBLICATIONS

Bankoski et al, "VP8 Data Format and Decoding Guide", Independent Submission RFC 6389, Nov. 2011, 305 pp.

Bankoski et al, "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Yeo et al; "Chroma Intra Prediction Using Template Matching With Reconstructed Luma Components"; 18th IEEE International Conference on Image Processing; Signal Processing Department; Institute for Infocomm Research; 2011; pp. 1637-1640.

\* cited by examiner

SUB8×8 BLOCK PROCESSING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Encoding can be based on motion estimation and/or spatial similarities and may be performed by breaking frames or images into blocks that are predicted. Predicting a block based on motion estimation can be performed based on one or more prediction blocks of reference frames. Predicting a block based on spatial similarities can be performed based on other blocks within the same frame or image. Differences (i.e., residual errors) between blocks and prediction blocks are compressed and encoded in a bitstream. A decoder uses the differences to reconstruct the frames or images.

SUMMARY

This application relates to encoding and decoding a current block of video data. Disclosed herein are aspects of systems, methods, and apparatuses for sub8×8 block processing.

One aspect is an apparatus for decoding a current block of size 8×8 including a memory and a processor according to one implementation of this disclosure. The processor configured to execute instructions stored in the memory to generate, for the current block, a luma block and a chroma block, divide the luma block into luma sub-blocks, and determine a respective prediction mode for each luma sub-block. The chroma block is of size 4×4, each luma sub-block is of size 4×4, and the respective prediction mode is an intra-mode or an inter-mode. The instructions also include instructions to, on condition that each of the respective prediction modes is the inter-mode, divide the chroma block into 2×2 chroma sub-blocks and determine a respective motion vector for each chroma sub-block.

Another aspect of the disclosed implementations is a method of coding a current block according to one implementation. The method includes generating a first block and a second block for the current block, dividing the first block into first sub-blocks including a first sub-block and a second sub-block, and determining a first prediction mode for the first sub-block and a second prediction mode for the second sub-block. The second block generated by subsampling the current block. The first prediction mode is an inter-mode or an intra-mode and the second prediction mode is the inter-mode or the intra-mode. The method also includes coding the second block based on a determination that the first prediction mode or the second prediction mode is the intra-mode.

Another aspect is an apparatus for coding a current block including a memory and a processor according to one implementation of this disclosure. The processor configured to execute instructions stored in the memory to generate a first block and a second block for the current block, divide the first block into first sub-blocks including a first sub-block and a second sub-block, and determine a first prediction mode for the first sub-block and a second prediction mode for the second sub-block. The second block generated by subsampling the current block. The first prediction mode is an inter-mode or an intra-mode and the second prediction mode is the inter-mode or the intra-mode. The instructions also include instructions to code the second block based on a determination that the first prediction mode or the second prediction mode is the intra-mode.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
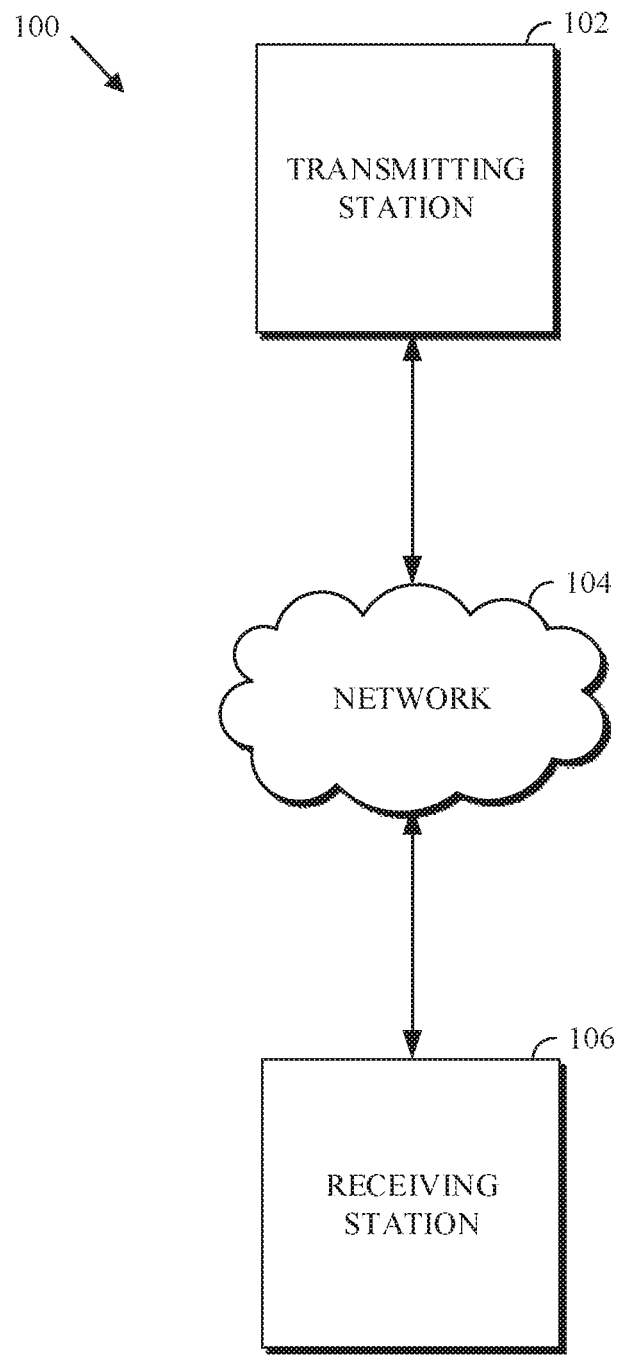
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Using an intra-prediction mode, intra prediction can attempt to predict the pixel values of a block of a frame of a video stream using pixels peripheral to the block; that is, using pixels that are in the same frame as the block but that are outside the block. Which pixels peripheral to the block are used can depend on the intra-prediction mode and/or a scan order of the blocks of a frame. For example, in a raster scan order, peripheral pixels above a current block (i.e., the block being encoded or decoded) and/or peripheral pixels to the left of the current block may be used. As such, blocks containing the peripheral pixels (e.g., above blocks and left blocks) must be reconstructed before the current block thereby creating a dependency (i.e., the current block cannot be predicted using an intra-prediction mode until the blocks containing the requisite peripheral pixels have been reconstructed).

Many different intra-prediction modes can be supported. For example, some codecs can support a DC intra-prediction mode, a planar intra-prediction mode, and/or other directional intra-prediction modes each having an intra prediction angle. Directional intra-prediction modes can include horizontal an intra-prediction mode, a vertical intra-prediction mode, and various other directional intra-prediction modes. As such, the prediction angle can be any angle between 0 and 360 degrees. The intra-prediction mode can be signalled by an encoder to a decoder. A prediction performed using any intra-prediction mode is referred to herein as intra-mode.

Encoding using temporal similarities can be known as inter prediction. Inter prediction can attempt to predict the pixel values of a block using a possibly displaced block or blocks from a temporally nearby frame (i.e., reference frame) or frames. A temporally nearby frame is a frame that appears earlier or later in time in the video stream than the frame of the block being encoded. Inter prediction is performed using a motion vector. A motion vector used to generate a prediction block refers to a frame (i.e., a reference frame) other than a current frame (i.e., the frame containing the current block). A prediction performed using inter prediction is referred to herein as inter-mode.

Some video codecs (i.e., encoders and/or decoders) use variable block size coding to capture the variations in video signal. For example, block sizes can be as large as 64×64 pixels and as small as 8×8 pixels. For complex signal content in a frame or a block, blocks of sizes 4×4, 4×8, and 8×4 can provide predictions that are more precise. Each block may include one or more blocks that may be used for prediction. Note that any references herein to block sizes of the form N×M are equivalent to block sizes of the form N×M.

The data in a frame or block are represented by pixels that have color values. The color value of each pixel can be represented by component values. Color values can be represented by separating luma (i.e., luminance) and chroma (i.e., chrominance) information, such as in a YUV color space (e.g., Y'CbCr). This type of color space is commonly used in image compression schemes for both still images and video, in part because it allows for chroma subsampling. Subsampling is a technique that can reduce the amount of data that is used to represent images and video.

Without subsampling, three bytes may be used to represent the color components of a pixel. Chroma subsampling reduces the spatial resolution of color information while retaining the spatial resolution of brightness information. This reduction in color information is often not readily perceived by humans, because the human visual system is more sensitive to brightness than it is to color. YUV images that implement subsampling reduce the amount of information needed to represent pixels. As examples, the YUV422 format utilizes four bytes per two pixels, the YUV411 format utilizes 6 bytes per four pixels, and the YUV420 format utilizes six bytes per four pixels. In the YUV420 format, for every four luma pixel values, there are one chroma U pixel value and one chroma V pixel value. As such, the YUV420 format divides the color components of a pixel into three planes, namely a luma Y plane, a chroma U plane, and a chroma V plane. The ratios between the planes are 4/1/1.

During chroma subsampling, some of the color information from the original image is discarded. In most formats, a chroma-subsampled image can include a luma value (e.g. Y') for each pixel, but for each chroma component value (e.g. U and V), there will be less values than there are pixels. For example, in the YUV420 image format, each U value and each V value corresponds to four pixels that form a two pixel by two pixel square in the original image.

In video coding, the YUV420 is a commonly used video data format. A block, such as an 8×8 block, can be partitioned into luma Y blocks and chroma U and V blocks. The luma blocks and the chroma blocks can be predicted separately. For example, an 8×8 luma block (or smaller) can be partitioned into smaller luma blocks. For example, an 8×8 luma block can be partitioned into four 4×4 luma sub-blocks, which are separately predicted. In the YUV420 format, a 4×4 luma sub-block can be associated with a 2×2 chroma block. As such, coding of a 4×4 luma block can require a hardware-implemented codec to process the associated 2×2 chroma block and to use a 2×2 transform block. Theoretically, a 2×2 chroma block may be either predicted using inter-mode and/or intra-mode. However, and as described above, intra-mode incurs data dependency in the hardware pipeline (i.e., a codec implemented in hardware) and can limit the throughput of the hardware video codec. As such, intra-mode prediction of 2×2 blocks, including 2×2 chroma blocks, is undesirable in hardware-implemented codecs.

To balance compression performance and hardware feasibility, video coding systems (i.e., codecs) can impose constraints on how sub8×8 blocks (i.e., blocks that are 8×8 pixels or smaller) are processed (i.e., coded). For example, such systems may impose the constraint that chroma blocks are processed in units no smaller than 4×4. Another constraint may be that sub8×8 luma sub-blocks are all either inter-mode or intra-mode predicted. As an illustration, for an 8×8 luma block, a codec may have a corresponding 4×4 chroma U block and a corresponding 4×4 chroma V block. The 8×8 luma block may be partitioned into four 4×4 luma sub-blocks. Such systems can impose the constraint that all of the 4×4 luma sub-blocks use either inter-mode or intra-mode. The corresponding 4×4 chroma U and chroma V clocks, whether in inter-mode or intra-mode, are handled in the unit of 4×4 (i.e., without further partitioning of the 4×4 chroma U and chroma V blocks).

In such systems, the 4×4 chroma blocks use the same prediction mode as the 8×8 luma block. In the case where all the 4×4 luma blocks use intra-mode, the 4×4 chroma U block and the 4×4 chroma V block also use intra-mode. In the case where all the 4×4 luma blocks use inter-mode, the four 4×4 sub-blocks of the 8×8 luma block may be constrained to use the same reference frame. The motion vectors of the four 4×4 luma sub-blocks may be averaged to derive the motion vectors for each of the 4×4 chroma U and/or 4×4 chroma V block. That is, the 4×4 chroma blocks are not partitioned further to avoid using 2×2 block sizes and transform sizes.

In such systems, averaging the motion vectors and/or using 4×4 chroma blocks can result in compression performance loss due to the imprecise chroma block prediction. Another disadvantage resulting from the averaging of the motion vectors is that the luma and chroma components of the 8×8 block are predicted from different pixels, which can cause color leakage.

Some video systems generate multiple bitstreams for an input video. One of the output bitstreams, referred to as the base layer, can be decoded by itself, and this bitstream provides the lowest scalability level of the video output. To achieve a higher level of video output, a decoder can process the base-layer bitstream together with other output bitstreams, referred to as enhancement layers. One or more enhancement layers may be added to the base layer to generate higher scalability levels. One example is spatial scalability, where the base layer represents the lowest resolution video and the decoder can generate higher resolution video by combining the base-layer bitstream together with additional enhancement-layer bitstreams. Thus, using additional enhancement-layer bitstreams produces a better quality video output. The teachings herein can be used to code (i.e., encode or decode) blocks in the different layers. For example, blocks in the base layer can be used for coding corresponding blocks in an enhancement layer.

In implementations according to this disclosure, each of the sub8×8 luma blocks can be independently predicted (e.g., using either the inter-mode or the intra-mode). In implementations according to this disclosure, hardware dependencies for intra-mode coding of 2×2 chroma blocks can be avoided while using the inter-mode for 2×2 chroma sub-blocks. As such, trade-offs between compression performance and hardware feasibility can be improved in the coding of sub8×8 blocks. As such, a codec according to this disclosure can explore the true motion vector of a 2×2 chroma block thereby improving the prediction precision of the chroma component.

Implementations according to this disclosure can result in 1.5%-2.2% compression gain over other video coding systems. As inter prediction is the most frequently used mode in video coding, implementations according to this disclosure can allow for the true motion inter prediction of 2×2 chroma blocks thereby resulting in compression gains since 2×2 chroma blocks can be more precisely predicted as compared to other systems that impose constraints as described above.

While the disclosure uses 2×2 chroma blocks for illustration purposes, the teachings herein are not limited to chroma blocks. For example, the teachings herein can apply to 2×2 luma blocks wherein prediction of the 2×2 luma blocks is dependent on the prediction mode(s) of other blocks.

Sub8×8 block processing for coding a current block is described herein first with reference to a system in which the teachings may be incorporated.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
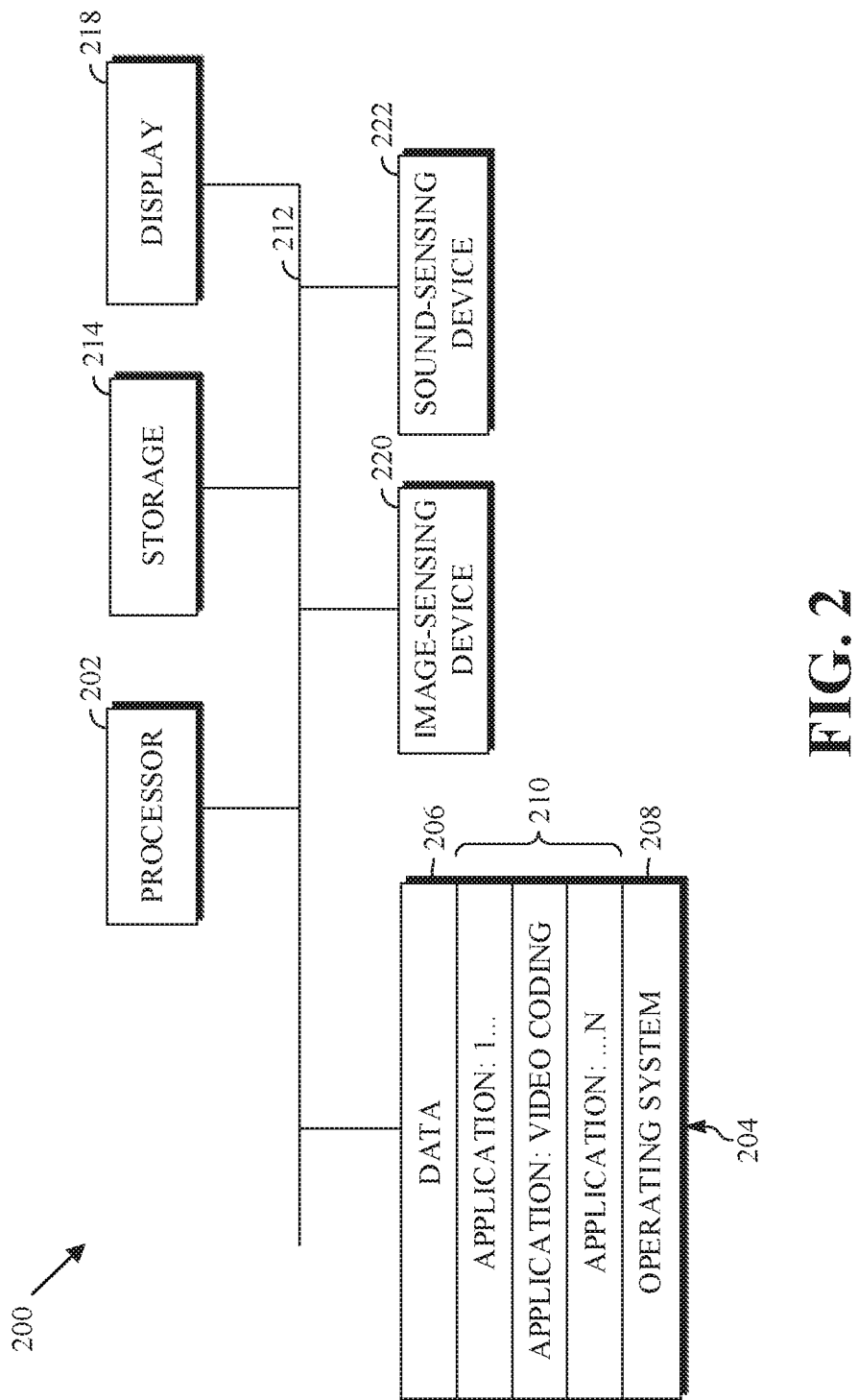
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods and processes described here. For example, the application programs 210 can include applications 1 through N, which further include a video coding application that performs the methods and processes described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example, a camera or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
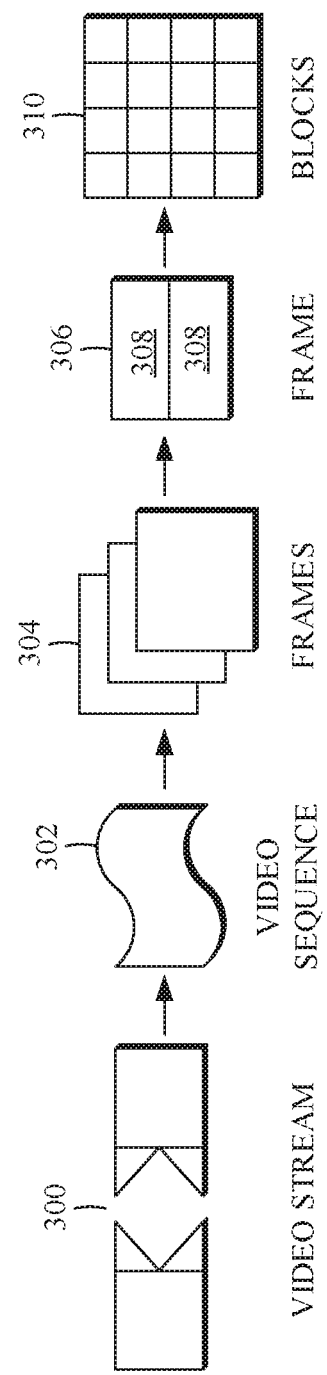
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
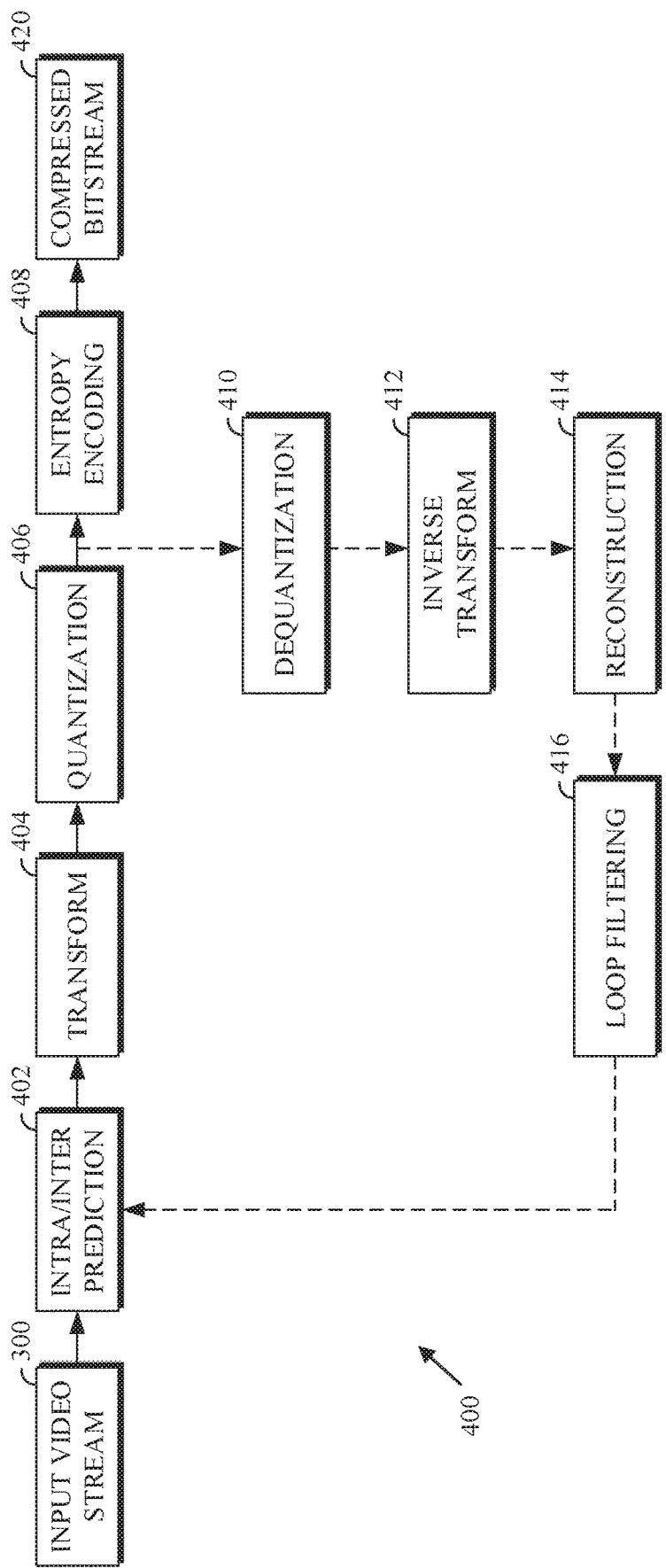
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
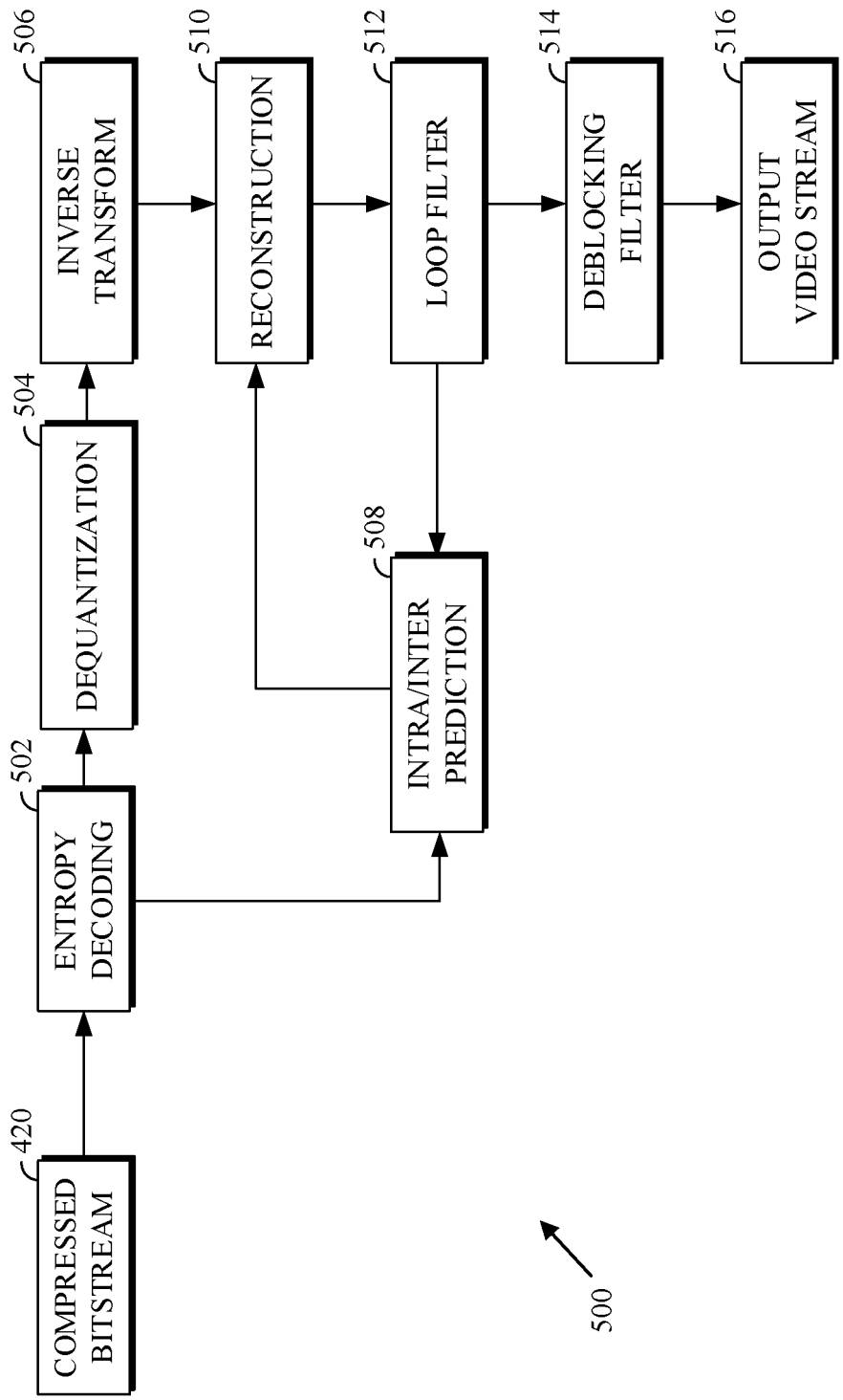
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 6 below. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally, or alternatively, the encoder 400 includes a deblocking filtering stage in addition to the loop filtering stage 416.

Figure 6:
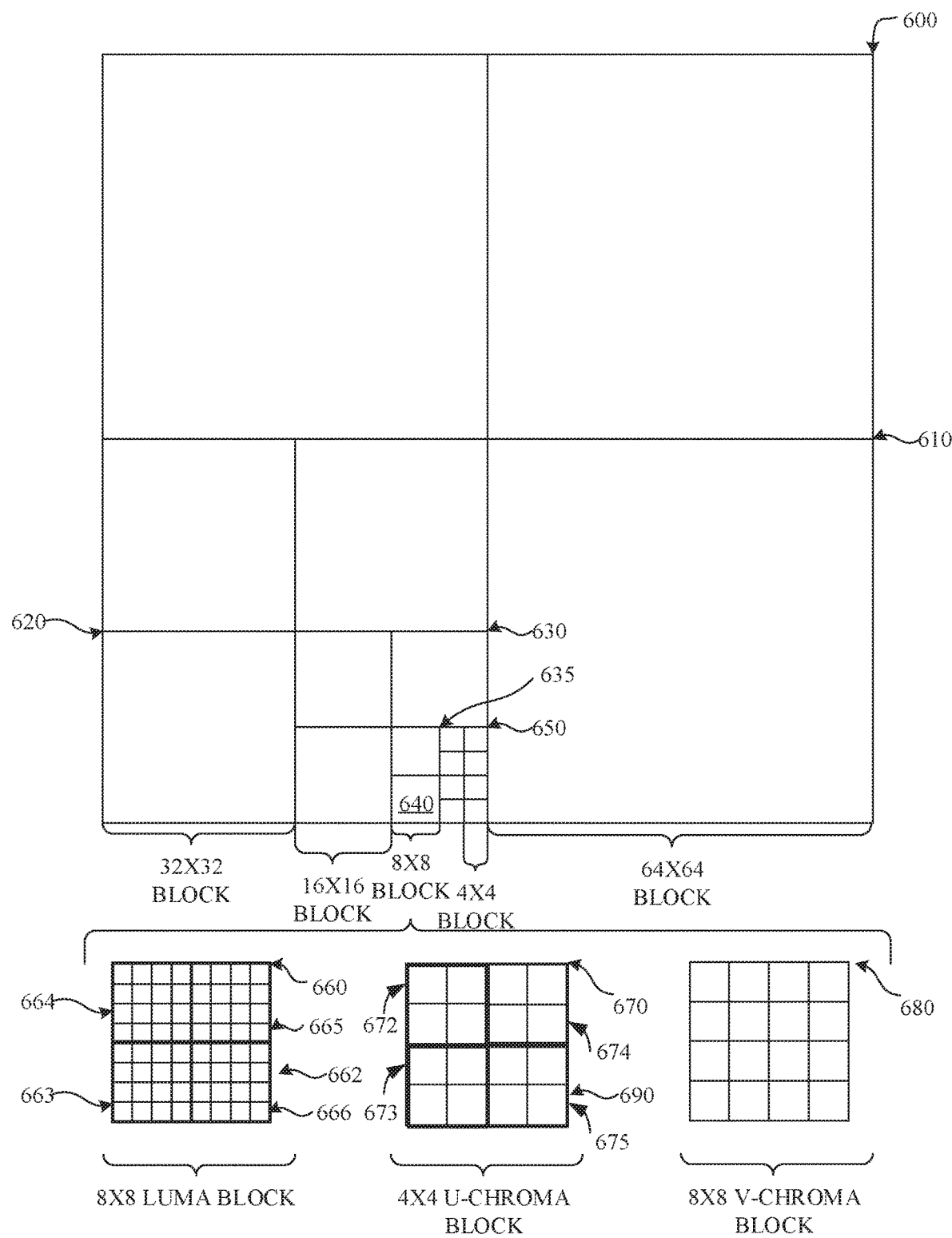
FIG. 6 is a block diagram of a representation of a portion of a frame in accordance with implementations of this disclosure.

FIG. 6 is a block diagram of a representation of a portion 600 of a frame, such as the frame 304 of FIG. 3, in accordance with implementations of this disclosure. As shown, the portion 600 of the frame includes four 64×64 blocks 610, in two rows and two columns in a matrix or Cartesian plane. In some implementations, a 64×64 block can be a maximum coding unit, N=64. Each 64×64 block can include four 32×32 blocks 620. Each 32×32 block can include four 16×16 blocks 630. Each 16×16 block can include four 8×8 blocks 635, such as block 640. Each 8×8 block 635 can include four 4×4 blocks 650. Each 4×4 block 650 can include 16 pixels, which can be represented in four rows and four columns in each respective block in the Cartesian plane or matrix. The pixels can include information representing an image captured in the frame, such as luma information, color information, and location information. In some implementations, a block, such as an 8×8 pixel block (e.g., the block 640) as shown, can include a luma block 660, which can include luma pixels 662; and two chroma blocks 670, 680, such as a U or Cb chroma block 670, and a V or Cr chroma block 680. The chroma blocks 670, 680 can include chroma pixels 690. For example, the luma block 660 can include 8×8 luma pixels 662 and each chroma block 670, 680 may include 4×4 chroma pixels 690. Although one arrangement of blocks is shown, any arrangement may be used. The blocks 670, 680 represent the chroma components of the block 640. The block 640 can be subsampled to generate the blocks 670/680. FIG. 6 illustrates that a luma block (i.e., the block 660) and a chroma block (i.e., one of the blocks 670, 680) are generated for the block 640. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

Figure 7:
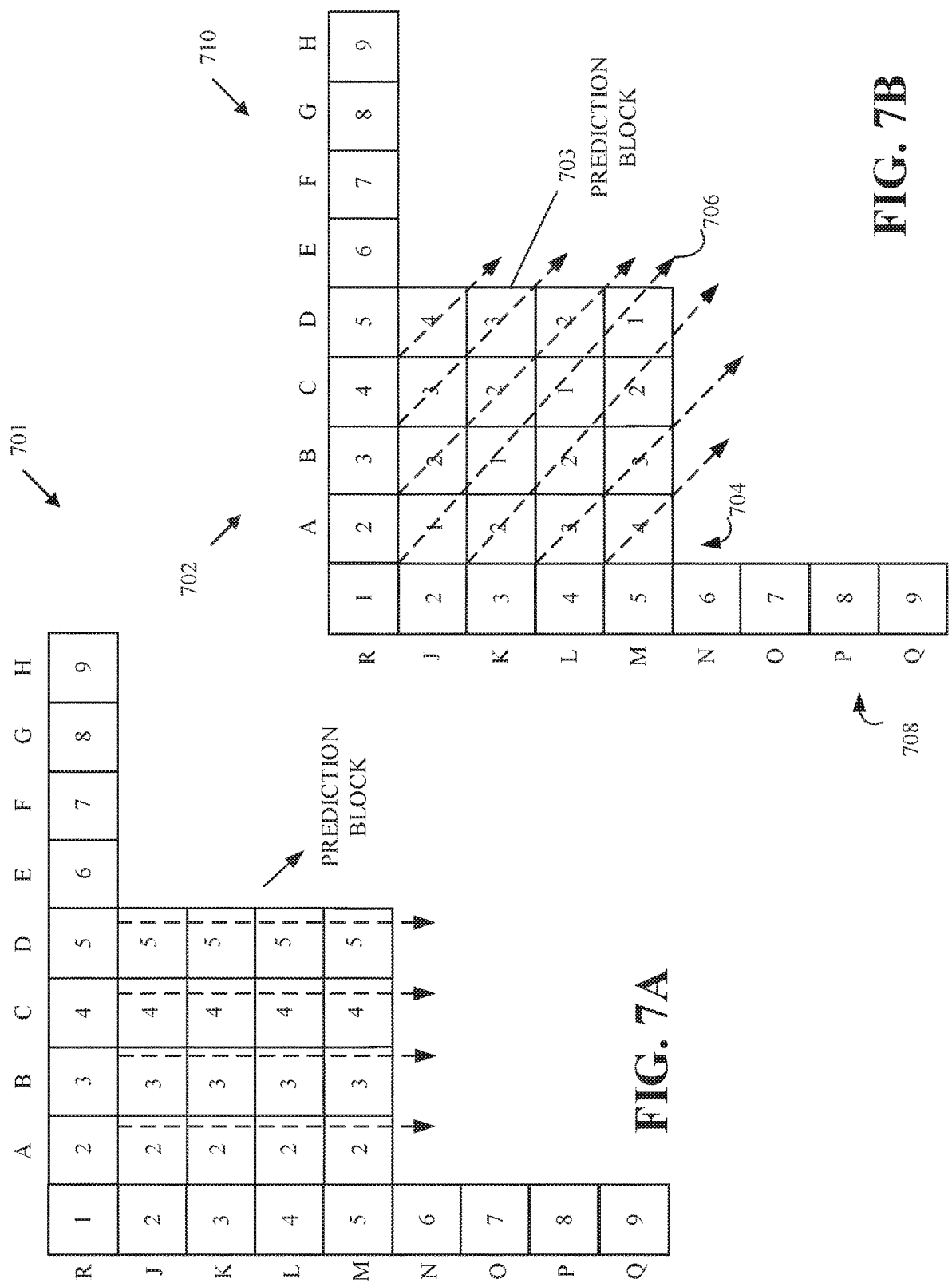
FIG. 7A is a diagram of an intra-mode that is an intra-prediction mode having a 90 degree prediction angle according to implementations of this disclosure.
FIG. 7B is a diagram of an intra-mode that is an intra-prediction mode having a 135 degree prediction angle according to implementations of this disclosure.

FIG. 7A is a diagram of an intra-mode 701 that is an intra-prediction mode having a 90 degree prediction angle according to implementations of this disclosure. FIG. 7A illustrates generating a prediction block for a 4×4 block to be predicted (also called a current block) using a vertical intra-prediction mode. The intra-prediction mode of FIG. 7A propagates peripheral pixels A through D down the columns of the prediction block such that each pixel in a column has its value set equal to that of the adjacent peripheral pixel A through D in the direction of the arrows.

FIG. 7B is a diagram of an intra-mode 702 that is an intra-prediction mode having a 135 degree prediction angle according to implementations of this disclosure. FIG. 7B illustrates generating a prediction block for a 4×4 current block using a diagonal intra-prediction mode. The intra-prediction mode of FIG. 7B propagates peripheral pixel values along a 135 degree line (i.e., lines 706) to the right and down to form the prediction block. The peripheral pixel values can include, for example, some of peripheral pixels 708 (i.e., pixels A through R) from blocks adjacent to the 4×4 current block of a frame 710, to form the prediction block 703 for the current block. Although the 135 degree intra-prediction mode in FIG. 14B is illustrated using the pixel values of the peripheral pixels 708 to generate the prediction block 703 for example, a linear combination (e.g., weighted average) of some (e.g., two, three, or more) of the peripheral pixels can be used to predict pixel values of the prediction block along lines extending through the block. For example, the pixel value 704 to be propagated along line 706 can be formed from a weighted average of pixel values K, L, and M.

Figure 8:
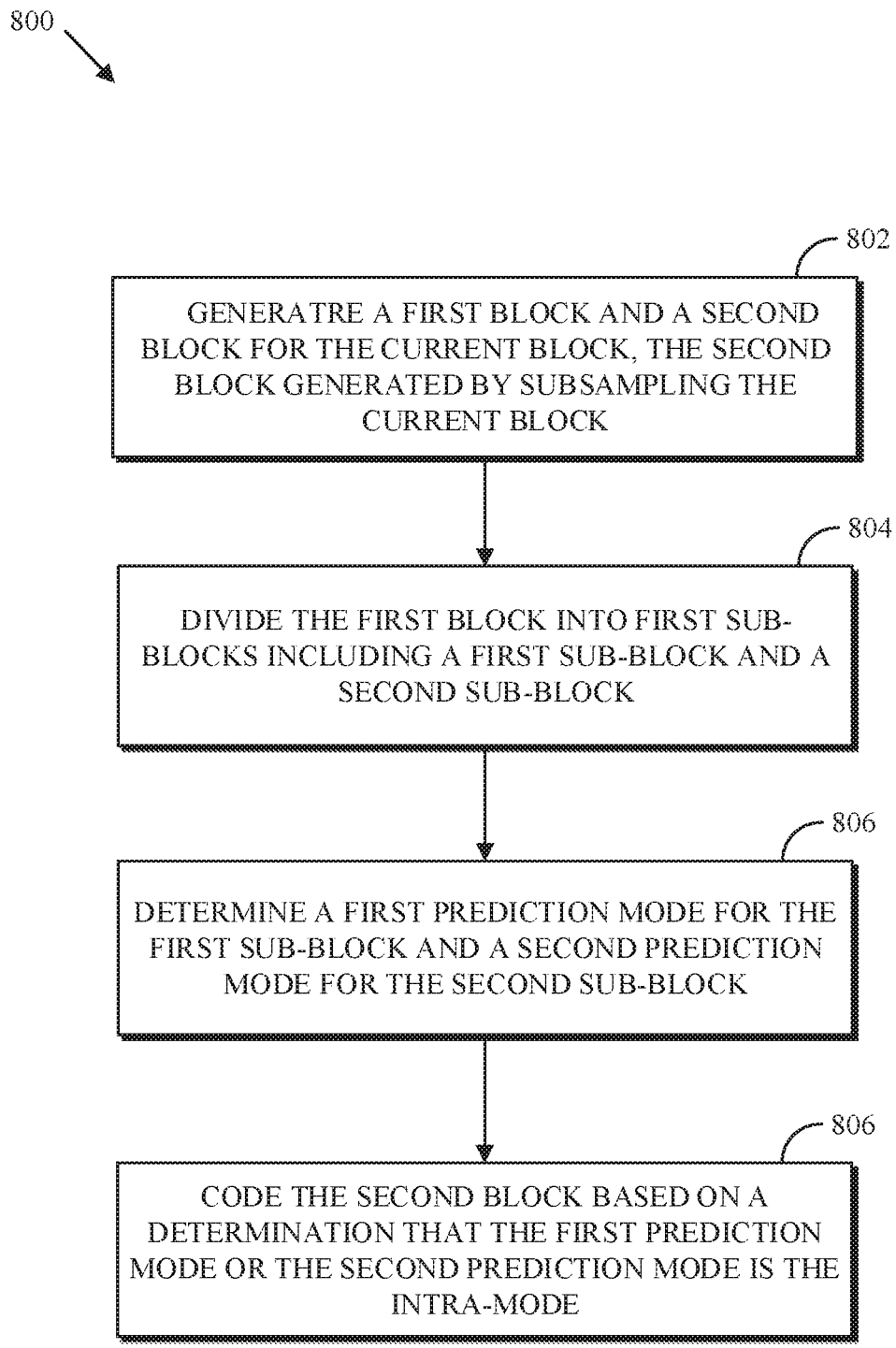
FIG. 8 is a flowchart diagram of a process for coding a current block according to an implementation of this disclosure.

FIG. 8 is a flowchart diagram of a process 800 for coding a current block according to an implementation of this disclosure. The process 800 generates a first block and a second for the current block. The second block is generated by subsampling the current block. The process 800 divides the first block into first sub-blocks and determines a prediction mode for each of the first sub-blocks. The prediction mode for each of the first sub-blocks can be either the intra-mode or the inter-mode. The process 800 codes the second block based on whether any of the prediction modes of the first sub-blocks is the intra-mode.

The process 800 can be implemented in an encoder such as the encoder 400 of FIG. 4. The process 800 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 800. In at least some implementations, the process 800 can be performed in whole or in part by the intra/inter prediction stage 402 of the encoder 400.

The process 800 may be performed by a decoder such as the decoder 500 of FIG. 5. The process 800 can be implemented, for example, as a software program that can be executed by computing devices such as the receiving station 106. The process 800 can be performed in whole or in part by the intra/inter-prediction stage 508 of the decoder 500. Implementations of the process 800 can be performed by storing instructions in a memory such as the memory 204 of the receiving station 106 to be executed by a processor such as CPU 202, for example.

The process 800 can be implemented using specialized hardware or firmware. Some computing devices can have multiple memories, multiple processors, or both. The steps or operations of the process 800 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

At 802, the process 800 generates a first block and a second block for the current block, the second block generated by subsampling the current block. In an example, the first block can be a block in a base layer and the second block can be a block in an enhancement layer or vice versa. In an example, and referring to FIG. 6 for an example, the current block can be the block 640, the first block can be the luma block 660, and the second block can be the chroma block 670. Any reference below to the chroma block 670, unless otherwise specified, applies equally to the chroma block 680.

At 804, the process 800 divides the first block into first sub-blocks. The first sub-blocks include a first sub-block and a second sub-block. For example, and referring to FIG. 6, FIG. 6 illustrates that the luma block 660 can be divided into four 4×4 sub-blocks including the 4×4 luma sub-blocks 663, 664, 665, 666. The first sub-block can be any of the four 4×4 sub-blocks 663-666 of the luma block and the second sub-block can be any of the other three sub-blocks. For example, the first sub-block can be the luma sub-block 664 and the second sub-block can be the luma sub-block 666.

At 806, the process 800 determines a first prediction mode for the first sub-block and a second prediction mode for the second sub-block. The first prediction mode can be, as described above, either the intra-mode or the inter-mode. The second prediction mode can be either the inter-mode or the intra-mode. In an example, the process 800 determines a prediction mode for each of the sub-blocks of the first sub-blocks. For example, the process 800 can determine a prediction mode for each of the 4×4 luma sub-blocks 663, 664, 665, 666.

At 808, the process 800 codes the second block based on a determination that at least one of the first prediction mode and the second prediction mode is the intra-mode. That is, if either of the first prediction mode of the first sub-block or the second prediction mode of the second sub-block is the intra-mode, then the second block is predicted differently than if neither of the prediction modes is the intra-mode. By extension, if any of the first sub-blocks is predicted using an intra-prediction mode (i.e., the intra-mode), then the second block is predicted using a first prediction method, otherwise the second block is predicted using a second prediction method. For example, if any of the 4×4 luma sub-blocks 663, 664, 665, 666 of the luma block 660 is predicted using an intra-prediction mode (i.e., the intra-mode), then the chroma block 670 is predicted using the first prediction method, otherwise the chroma block 670 is predicted using the second prediction method. The first prediction method and the second prediction method are further described below.

When the process 800 is implemented by an encoder, such as the encoder 400 of FIG. 4, "coding the second block based on a determination that at least one of the first prediction mode and the second prediction mode is the intra-mode" means "encoding the second block based on a determination that at least one of the first prediction mode and the second prediction mode is the intra-mode." When the process 800 is implemented by a decoder, such as the decoder 500 of FIG. 5, "coding the second block based on a determination that at least one of the first prediction mode and the second prediction mode is the intra-mode" means "decoding the second block based on a determination that at least one of the first prediction mode and the second prediction mode is the intra-mode."

Figure 9:
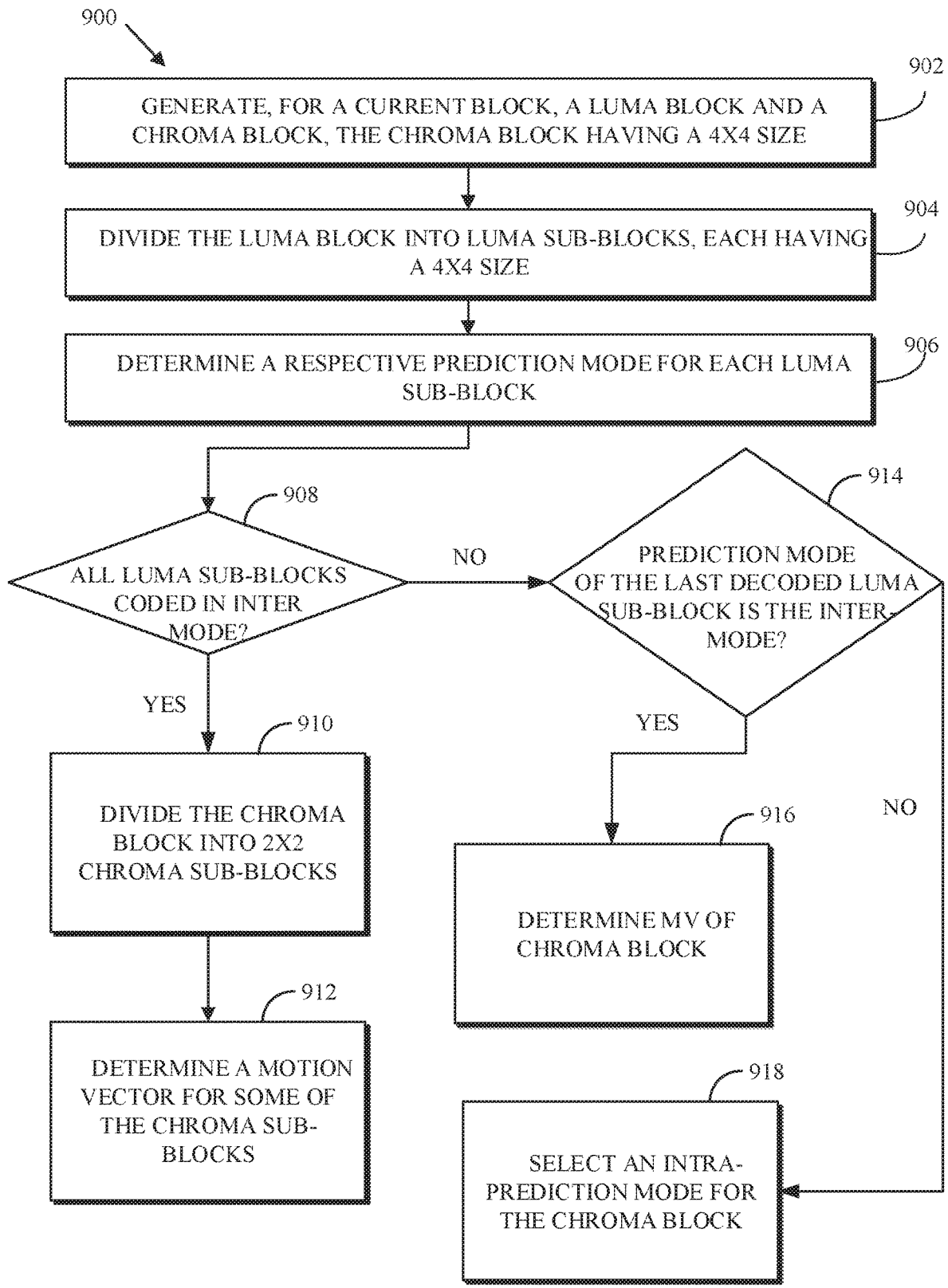
FIG. 9 is a flowchart diagram of a process for decoding a current block of size 8×8 according to an implementation of this disclosure.

FIG. 9 is a flowchart diagram of a process 900 for decoding a current block of size 8×8 according to an implementation of this disclosure. The process 900 generates a luma block and a 4×4 chroma block for the current block. The luma block is further divided into four 4×4 luma sub-blocks. The chroma block is decoded based on whether all the 4×4 luma sub-blocks are inter-mode predicted. If the 4×4 luma sub-blocks were predicted using the inter-mode, then the chroma block is divided into 2×2 chroma sub-blocks and each 2×2 chroma sub-block is predicted using the inter-mode. If at least one of the 4×4 luma sub-blocks uses intra-mode, then the 4×4 chroma block is predicted using the same prediction mode (i.e., either the intra-mode or the inter-mode) as that of the bottom-right luma sub-block.

The process 900 may be performed by a decoder such as the decoder 500 of FIG. 5. The process 900 can be implemented, for example, as a software program that can be executed by computing devices such as the receiving station 106. The process 800 can be performed in whole or in part by the intra/inter-prediction stage 508 of the decoder 500. Implementations of the process 800 can be performed by storing instructions in a memory such as the memory 204 of the receiving station 106 to be executed by a processor such as CPU 202, for example.

Implementations of the process 900 can be performed by storing instructions in a memory such as the memory 204 of the receiving station 106 to be executed by a processor such as CPU 202, for example. The process 900 can be implemented using specialized hardware or firmware. Some computing devices can have multiple memories, multiple processors, or both. The steps or operations of the process 900 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

At 902, the process 900 generates, for the current block, a luma block and a chroma block. The chroma block is of size 4×4. At 904, the process 900 divides the luma block into luma sub-blocks, each having a 4×4 size. The luma block and the chroma block can be as described above with respect to FIG. 6. For example, the current block can be the block 640, the luma block can be luma block 660, the chroma block can be one or both of the chroma blocks 670, 680, and the luma sub-blocks can be the 4×4 luma sub-blocks 663, 664, 665, 666.

At 906, the process 900 determines a respective prediction mode for each luma sub-block. That is, the process 900 can process each of the luma sub-blocks to determine the respective prediction mode of the luma sub-block. The process 900 can process a luma sub-block by steps including decoding, from an encoded bitstream, such as the compressed bitstream 420 of FIG. 5, prediction information related to the luma sub-block. For example, the processing can include reconstructing the luma sub-block, as described with respect to FIG. 5. For example, the reconstruction can include selecting an intra-prediction mode or the inter-mode. If an intra-prediction mode is selected for the luma sub-block, then the prediction mode of the luma sub-block is determined to be the intra-mode; otherwise, the prediction mode of the luma sub-block is determined to be the inter-mode.

At 908, if all the luma sub-blocks are coded in inter-mode (i.e., on condition that each of the respective prediction modes is the inter-mode), then the process 900 proceeds to 910; otherwise, the process 900 proceeds to 914. That is, at 908, on condition that at least one respective prediction mode is the intra-mode, the process 900 proceeds to 914.

At 910, the process 900 divides the chroma block into 2×2 chroma sub-blocks. For example, and referring to FIG. 6 for illustration, the process 900 can divide the chroma block 670 into the 2×2 chroma sub-blocks 672, 673, 674, 675.

At 912, the process 900 determines a respective motion vector for at least some of chroma sub-blocks. A respective motion vector can be determined for each of the chroma sub-blocks. In an example, the motion vector for a chroma sub-block can be derived from the motion vector of the co-located luma sub-block. For example, the motion vectors of the 2×2 chroma sub-blocks 672, 673, 674, 675 can be derived, respectively, from the 4×4 luma sub-blocks 663, 664, 665, 666. A motion vector can derived by down scaling (e.g., by a factor of 2) the motion vector of the luma sub-block.

On condition that at least one respective prediction mode is the intra-mode, the process 900 decodes the chroma block using a prediction mode of a last decoded sub-block of the luma sub-blocks. The last decoded luma sub-block can be as described below. For example, and referring to FIG. 6, if the luma sub-blocks of the luma block 660 are processed (i.e., decoded or reconstructed) in a raster scan order, then the last decoded luma sub-block is the 4×4 luma sub-block 666. As such, if the 4×4 luma sub-block 666 uses the inter-mode, then the chroma block 670 is coded using the inter-mode. if the 4×4 luma sub-block 666 uses the intra-mode, then the chroma block 670 is coded using the intra-mode At 914, if the prediction mode of the last decoded luma sub-block is the inter-mode, then the process 900 proceed (YES) to 916. At 916, the process 900 determines a motion vector for the chroma block. For example, the process 900 can determine a motion vector (i.e., first motion vector) for the chroma block using a motion vector (i.e., second motion vector) of the last decoded luma sub-block and decodes the chroma block using the motion vector of the chroma block.

If, at 914, the prediction mode of the last decoded luma sub-block is not the inter-mode (i.e., it is the intra-mode), then the process 900 proceeds to 918. At 918, the process 900 selects an intra-prediction mode for the chroma block. The process 900 can then decode the chroma block using the intra-prediction mode.

In an example, to code the second block based on a determination that the first prediction mode or the second prediction mode is the intra-mode includes, on condition that at least one of the first prediction mode and the second prediction mode is the intra-mode (i.e., the first prediction method), selecting the second prediction mode of the second sub-block as a prediction mode for the second block.

For example, assuming that the luma sub-block 664 is predicted using the inter-mode and the luma sub-block 666 is predicted using the intra-mode, the chroma block 670 can be predicted using the intra-mode. The luma sub-block 666 and the chroma block can have different intra-prediction modes. For example, the luma sub-block 666 can have the DC intra-prediction mode and the chroma block can have the intra-prediction mode having the 135-degree prediction angle. That is, both the luma sub-block 666 and the chroma block 670 can use the intra-mode, but each can use a different intra-prediction mode.

As another example, assuming that the luma sub-block 664 is predicted using the intra-mode and the luma sub-block 666 is predicted using the inter-mode, the chroma block 670 can be predicted using the inter-mode. A motion vector is determined for the second block (e.g., the chroma block). In an example, the motion vector for the second block can be determined by subsampling the motion vector of the second sub-block. For example, the motion vector for the chroma block 670 can be derived by sub-sampling the motion vector of the luma sub-block 666. In another example, a motion search can be performed to determine the motion vector for the second block.

In an implementation, the second block is selected based on a scan order of the first sub-blocks. The second block can be the last sub-block processed in the first sub-blocks. For example, and referring again to FIG. 6, if the 4×4 sub-blocks of the luma block 660 are processed in the raster order of luma sub-blocks 664, 665, 663, and 666, then the last sub-block processed is the 4×4 luma sub-block 666. Processing a sub-block in this example can mean reconstructing the sub-block as described above with respect to the reconstruction path of the encoder of FIG. 4 and the reconstruction stage 510 of FIG. 5. In another example, the second sub-block can be selected based on the scan order of blocks within a frame rather than based on the scan order of the sub-blocks of the first block.

The second sub-block that is used to determine the prediction mode (i.e., intra-mode or inter-mode) for the second block can be the sub-block that is used, in intra-mode, as a reference block for a next block (e.g., the block following the current block in the scan order) to be processed. As indicated above, peripheral pixels from the left or above neighbor blocks can be used by an intra-prediction mode. As such, in a raster scan order, the bottom right sub-block (e.g., the 4×4 luma sub-block 666) can be selected as the second sub-block because this block can include the top or left peripheral pixels when coding the next block. Selecting the last processed sub-block of the first block can result in a more spatially consistent reference block.

In an example, to code the second block based on a determination that the first prediction mode or the second prediction mode is the intra-mode includes, on condition that neither one of the first prediction mode nor the second prediction mode is the intra-mode (i.e., the second prediction method), dividing the second block into second sub-blocks and predicting each second sub-block using the inter-mode.

For example, and referring to FIG. 6 again, if all the 4×4 luma sub-blocks 663, 664, 665, 666 of the luma block 660 are predicted using the inter-mode, then no spatial dependency exists when predicting the chroma block 670. As no spatial dependency exists (as described above with respect to hardware-implemented codecs), the chroma block 670 can be divided into the 2×2 chroma sub-blocks 672, 673, 674, 675. Each of the 2×2 chroma sub-blocks can be separately inter-mode predicted thereby improving the prediction precision of the chroma block 670. In an example, the motion vectors of the co-located 4×4 luma sub-blocks 663, 664, 665, 666 can be used to determine (e.g., by scaling) the respective motion vectors of the 2×2 chroma sub-blocks 672, 673, 674, 675. In another example, motion vectors for the 2×2 chroma sub-blocks 672, 673, 674, 675 can be generated by performing motion searches (i.e., without reference to the motion vectors of the co-located 4×4 luma sub-blocks 663, 664, 665, 666).

In an example, when the second block is divided into second sub-blocks, a process according to implementations of this disclosure can transform the residual of the second block, rather than the residuals of each of the second sub-blocks, into the transform domain. For example, even though, in the example above, the chroma block 670 is divided into the 2×2 chroma sub-blocks 672, 673, 674, 675, the residual of the chroma block 670 is transformed into the frequency domain. In another example, the residuals of each of the second sub-blocks is transformed into the frequency domain. For example, each of the 2×2 chroma sub-blocks 672, 673, 674, 675 can be transformed into the frequency domain using a 2×2 transforms.

In an example, when the second block is coded using an intra-prediction mode, a process according to implementations of this disclosure can entropy code the intra-prediction mode of the second block (i.e., a second intra-prediction mode) conditioned on the intra-prediction mode of the second sub-block (i.e., a first intra-prediction mode). That is, the intra-prediction mode of the second sub-block (e.g., the luma sub-block) can be used for determining a context for entropy coding (e.g., encoding or decoding) the second block. For example, the intra-prediction mode of the luma component (e.g., the bottom-right sub-block) can be used as a context for selecting a probability model for the coding the intra-prediction mode of the chroma component.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for decoding a current block of size 8×8, comprising:
   a memory; and
   a processor configured to execute instructions stored in the memory to:
      generate a luma block and a chroma block for the current block, the chroma block is of size 4×4;
      divide the luma block into luma sub-blocks, each having a 4×4 size, wherein the luma sub-blocks are each a respective luma prediction block;
      determine a respective prediction mode for each luma sub-block, the respective prediction mode is an intra-mode or an inter-mode;
      only on a condition that each of the respective prediction modes of the luma sub-blocks is determined to be the inter-mode:
         divide the chroma block into four 2×2 chroma sub-blocks, wherein each of the 2×2 chroma sub-blocks is a respective chroma prediction block; and
         determine a respective motion vector for each chroma sub-block; and
      on a condition that at least one of the respective prediction modes of the luma sub-blocks is determined to be the intra-mode,
         decode the chroma block using a prediction mode of a last decoded luma sub-block of the luma sub-blocks,
            wherein the last decoded luma sub-block is a last decoded sub-block, in a scan order, of the luma sub-blocks.

2. The apparatus of claim 1, wherein the prediction mode of the last decoded luma sub-block is the inter-mode, the instructions further comprise instructions to:
   determine a first motion vector for the chroma block using a second motion vector of the last decoded luma sub-block; and
   decode the chroma block using the first motion vector.

3. The apparatus of claim 1, wherein the prediction mode of the last decoded luma sub-block is a first intra-prediction mode, the instructions further comprise instructions to:
   select a second intra-prediction mode for the chroma block; and
   decode the chroma block using the second intra-prediction mode.

4. The apparatus of claim 3, wherein the instructions further comprise instructions to:
   select a context for entropy decoding the second intra-prediction mode, wherein the context is conditioned on the first intra-prediction mode.

5. A method of coding a current block, comprising:
   generating a first block and a second block for the current block, the second block generated by subsampling the current block;
   dividing the first block into first sub-blocks comprising a first sub-block and a second sub-block, wherein the current block is an 8×8 block and each first sub-block is a 4×4 luma prediction block, wherein the second block is a 4×4 chroma block;
   determining a first prediction mode for the first sub-block and a second prediction mode for the second sub-block, the first prediction mode is an inter-mode or an intra-mode and the second prediction mode is the inter-mode or the intra-mode; and
   coding the second block based on a determination that the first prediction mode or the second prediction mode is the intra-mode by steps comprising:
      on a condition that the first prediction mode or the second prediction mode is determined to be the intra-mode, selecting the second prediction mode of the second sub-block as a prediction mode for the second block; and
      on a condition that neither one of the first prediction mode nor the second prediction mode is the intra-mode, performing steps comprising:
         dividing the second block into second sub-blocks; and
         predicting at least some of the second sub-blocks using the inter-mode.

6. The method of claim 5, further comprising:
processing the first sub-blocks based on a scan order, wherein the second sub-block is a last sub-block processed in the scan order.

7. The method of claim 6, wherein the scan order is a raster scan order and the second sub-block is a bottom-right sub-block.

8. An apparatus for coding a current block, comprising:
a memory; and
a processor configured to execute instructions stored in the memory to:
   generate a first block and a second block for the current block, the second block generated by subsampling the current block;
   divide the first block into first sub-blocks comprising a first sub-block and a second sub-block;
   determine a first prediction mode for the first sub-block and a second prediction mode for the second sub-block, the first prediction mode is an inter-mode or an intra-mode and the second prediction mode is the inter-mode or the intra-mode; and
   code the second block based on a determination that the first prediction mode or the second prediction mode is the intra-mode by instructions including:
      only on a condition that neither one of the first prediction mode nor the second prediction mode is determined to be the intra-mode:
         divide the second block into second sub-blocks; and
         predict at least some of the second sub-blocks using the inter-mode.

9. The apparatus of claim 8, wherein to code the second block based on a determination that the first prediction mode or the second prediction mode is the intra-mode comprises to:
   on a condition that at least one of the first prediction mode and the second prediction mode is the intra-mode, select the second prediction mode of the second sub-block as a prediction mode for the second block.

10. The apparatus of claim 9, wherein the instructions further comprise instructions to:
   process the first sub-blocks based on a scan order, wherein the second sub-block is a last sub-block processed in the scan order.

11. The apparatus of claim 10, wherein the scan order is a raster scan order and the second sub-block is a bottom-right sub-block.

12. The apparatus of claim 8, wherein the current block is an 8×8 block and each first block is a 4×4 luma block.

13. The apparatus of claim 12, wherein the second block is a 4×4 chroma block and wherein each second sub-block is a 2×2 chroma block.

* * * * *